United States Patent [19]

Iwatsuki et al.

[11] Patent Number: 4,909,345
[45] Date of Patent: Mar. 20, 1990

[54] POWER TRANSMISSION DEVICE FOR FOUR WHEEL DRIVE VEHICLES

[75] Inventors: Tatsuya Iwatsuki, Okazaki; Takenori Kano; Fumitomo Yokoyama, both of Anjo; Yasunari Nakamura, Nogoya; Isamu Minemoto, Okazaki; Teruo Akashi, Nagoya; Masaharu Tanaka; Seitoku Kubo, both of Toyota, all of Japan

[73] Assignees: Aisin AW Co., Ltd., Anjo; Toyota Jidosha Kabushiki Kaisha, Toyota, both of Japan

[21] Appl. No.: 250,296

[22] Filed: Sep. 28, 1988

[30] Foreign Application Priority Data

Sep. 29, 1987 [JP] Japan .................................. 62-245306
Sep. 29, 1987 [JP] Japan .................................. 62-245310
Sep. 29, 1987 [JP] Japan .................................. 62-245327

[51] Int. Cl.⁴ .............................................. B60K 17/35
[52] U.S. Cl. .................................................... 180/250
[58] Field of Search ................ 180/249, 250, 248, 247, 180/233

[56] References Cited

U.S. PATENT DOCUMENTS

| 4,511,014 | 4/1985 | Makita ................................ 180/233 |
| 4,715,467 | 12/1987 | Sakai .................................. 180/247 |
| 4,763,749 | 8/1988 | Miura et al. ......................... 180/249 |
| 4,787,471 | 11/1988 | Kabayashi et al. .................. 180/249 |

FOREIGN PATENT DOCUMENTS

62-74715 4/1987 Japan .................................. 180/250
62-74716 6/1987 Japan .
2140104 11/1984 United Kingdom .
2172863 10/1986 United Kingdom .

Primary Examiner—Charles A. Marmor
Assistant Examiner—Richard Camby
Attorney, Agent, or Firm—Kanesaka and Takeuchi

[57] ABSTRACT

A power transmission device for four wheel drive vehicle includes a differential motion limiting device, for limiting differential motion of a center differential device, which is made up by a wet-type frictional clutch and a hydraulic actuator. Under running condition, the frictional clutch is engaged by certain engaging force, and considering frictional coefficient of roads, the clutch is engaged with some slips so that torque distribution to front and rear wheels becomes even (50:50), then torque is distributed from the center differential device to front and rear wheels. The line pressure is applied to the hydraulic actuator through a regulator valve. In normal running condition, the regulator valve reduces the line pressure pre certain ratio, the reduced pressure is applied to the hydraulic actuator. In the case the manual valve being shifted to R range or low speed position, the regulator valve is switched to apply the line pressure directly to the hydraulic actuator. In the case of the manual valve being shifted to a low speed position, then from the low speed port of the manual valve, the line pressure is applied to a modulator valve where the line pressure is modulated, and applied to a back pressure port of a primary regulator valve to boost the line pressure up to certain volume.

16 Claims, 5 Drawing Sheets

POWER TRANSMISSION DEVICE FOR FOUR WHEEL DRIVE VEHICLES

BACKGROUND OF THE INVENTION

The present invention relates to a power transmission device for a four wheel drive vehicle mounted on an automobile, particularly to the control of a differential motion limiting device regulating differential motion of the center differential device.

DESCRIPTION OF THE PRIOR ART

In a power transmission device for a four wheel drive vehicle, in general, in case the device is a part-time system, it is required to operate a switch from two wheel driving condition to four wheel driving condition or vice versa, and in case the device is full-time system, it is required to work or release a center differential, so the driver is required to master complicated driving skills considering the road conditions to do the above operations.

Then a power transmission device for a four wheel drive vehicle of wet-type frictional clutch system and a traction control system both of which require no operations mentioned above are proposed.

The wet-type multi-plate frictional clutch system is based on a power transmission device for a four wheel drive vehicle of the part-time-system, (for example a power transmission device for a four wheel drive vehicle based on front wheel drive), and torque is transmitted to rear wheel side through the wet-type multi-plate frictional clutch which is engaged by a hydraulic pressure (such as a line pressure) varying per road conditions. Because of the above, at cornering, rotational difference is absorbed by slipping of the clutch, and further by regulating the clutch engaging force, driving torque to the rear wheel is changed.

For a traction control system, a hydraulic clutch and a center differential device are coupled, wherein in normal running condition, the vehicle is operated as a two wheel drive vehicle such as a front-engine-rear-drive, and in case rear wheels (driving wheel) turn without load, the center differential device is connected by a hydraulic clutch through judgement of a computer, by which 35% torque is distributed to the front wheel. Thereafter in case idle turning of wheels still being observed, the center differential device becomes direct coupling condition, so that the torque is distributed evenly to the front wheels (50%) and the rear wheels (50%).

The above wet-type frictional clutch system needs comparatively high hydraulic pressure to withstand driving torque at four wheel driving condition because driving torque for rear wheel driving is provided through the wet-type frictional clutch based on the front wheel drive system. On the other hand, comparatively low hydraulic pressure is applied based on the above comparatively high hydraulic pressure when tight-cornering. The wet-type frictional clutch of this type requires large clutch capacity because the wet-type frictional clutch allows its slips on the basis of the direct coupling of the front and rear wheels. Consequently, slips between the road and the wheels may possibly occur, fuel efficiency may deteriorate, tires are worn comparatively early, and rotational difference between the front and rear wheels is not sufficiently absorbed at tight-cornering because the clutch hydraulic pressure is not lowered sufficiently.

The above traction control system requires a sophisticated computer to monitor the turning speed of wheels, the control is quite intricate and the device itself is expensive.

SUMMARY OF THE INVENTION

The first object of the present invention is purposed to provide a power transmission device for a four wheel drive vehicle which is made up by inexpensive devices and can maintain the four wheel drive condition without driver's operation.

The second objective of the present invention is to provide a power transmission device for a four wheel drive vehicle which can absorb rotational difference between the front and rear wheels properly to maintain driving stability under normal driving condition, and which frees sticking condition of the tire by regulation differential motion of the center differential device strongly.

Furthermore, the third objective of the present invention is to provide a power transmission device for a four wheel drive vehicle which is made up by inexpensive devices, and has compatibility for the both cases of normal running condition and sticking condition: in the normal running condition, rotational difference between the front and rear wheels is properly absorbed by the center differential device; in the sticking condition, the center differential device is strongly regulated.

Figure 1:
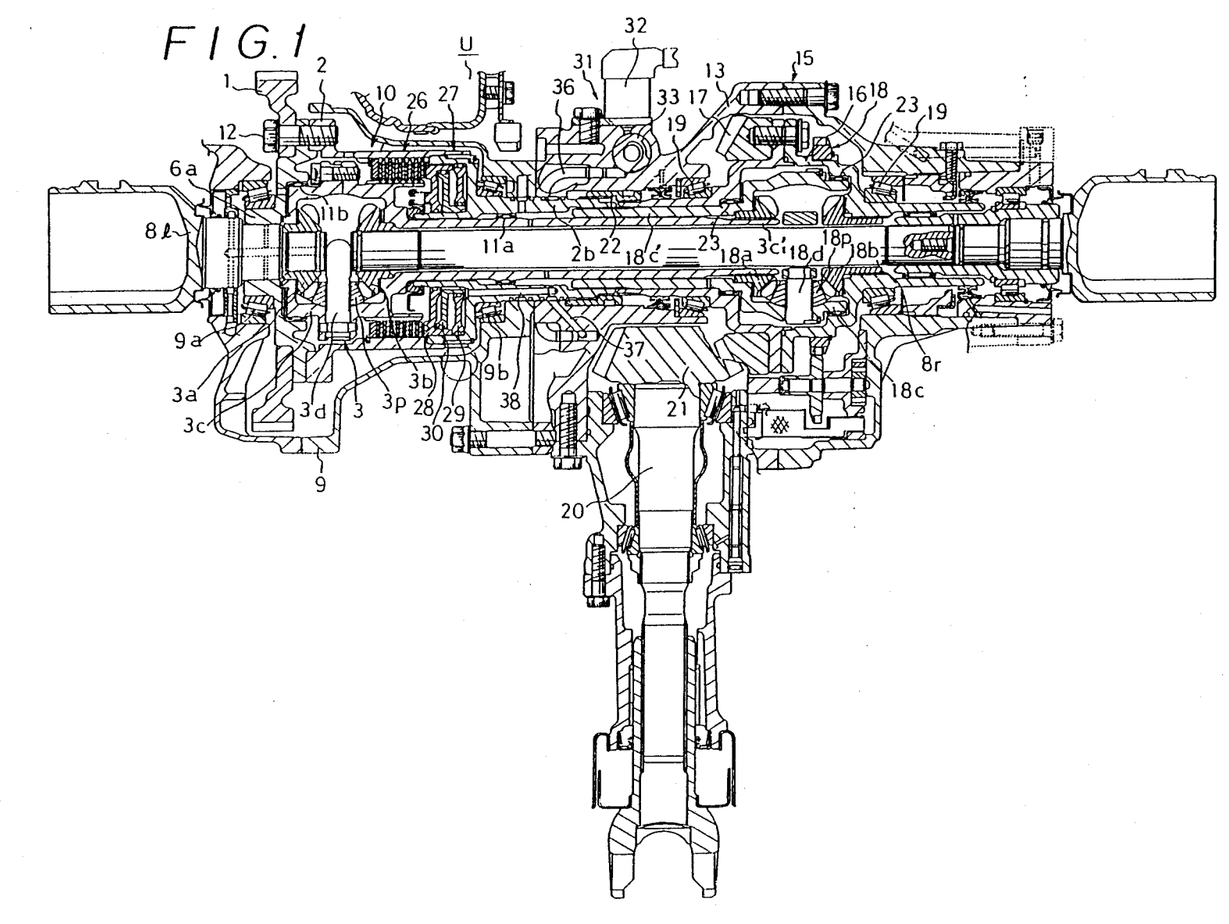
FIG. 1 is a cross sectional view of a power transmission device for a four wheel drive vehicle of the present invention.

The present invention is explained along with FIG. 1, wherein a power transmission device for a four wheel drive vehicle comprises a center differential device (18) transmitting torque from an automatic transmission to both front and rear wheels, and a differential motion limiting device (10) to regulate differential motion of the center differential device (18); the differential motion limiting device (10) is made up by a wet-type frictional clutch (26) and a hydraulic actuator (27) which engages the clutch (26) at certain engaging force by applying certain volume of hydraulic pressure to the actuator (27).

And, the certain hydraulic pressure mentioned above may be a line pressure from the automatic transmission, a hydraulic pressure reduced by certain ratio from the line pressure and a hydraulic pressure controlled by electric signals.

Figure 2:
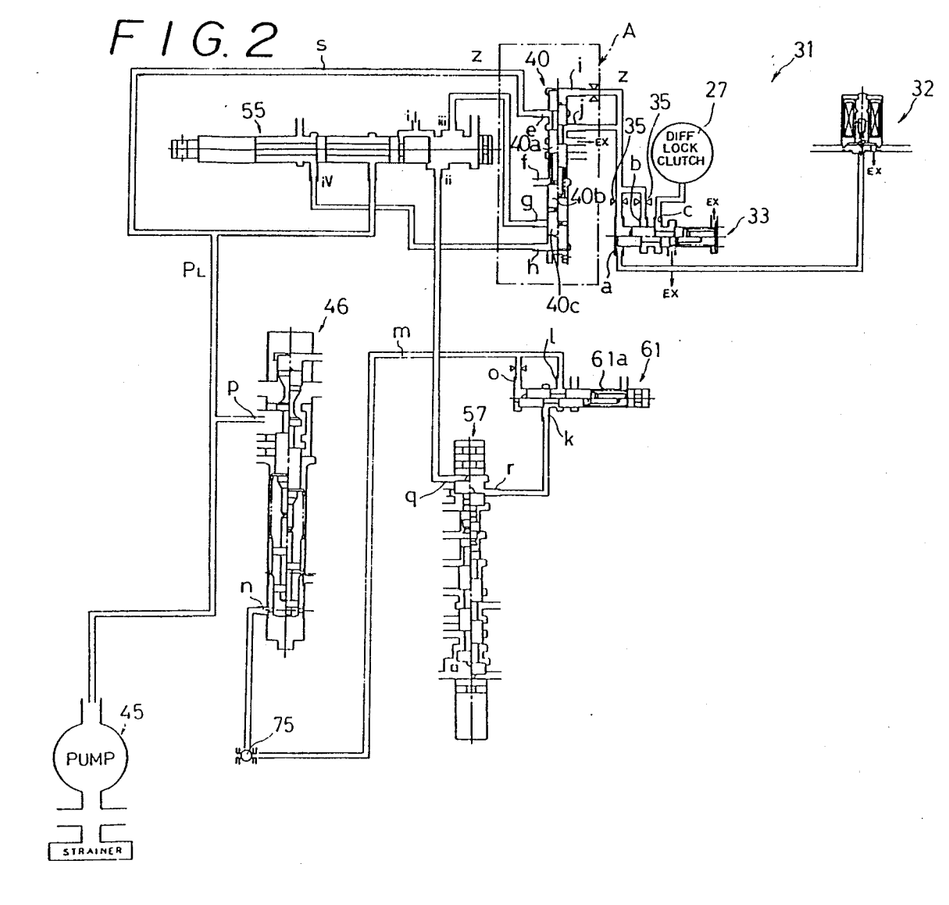
FIG. 2 is a view showing main portion of the hydraulic circuit.

While certain hydraulic pressure based on the line pressure is applied to the hydraulic actuator (27), and as shown in FIG. 2 for example, at low speed position of a manual valve (55) (for example; L and 2nd range), hydraulic pressure from a modulator valve such as a second modulator valve (61) is applied to a back pressure side (n) of a primary regulator valve (46). Accordingly, line pressure at low throttle opening is boosted to certain volume, and is applied to the actuator (27).

On the other hand, certain hydraulic pressure is applied to the hydraulic actuator (27) through a regulator valve (40), and a regulator valve (40) is shifted by the manual valve (55). In the normal running condition, the regulator valve (40) reduces line pressure per certain ratio, leads it to the actuator (27). At a reverse (R) or low speed (L) position of the manual valve (55), the regulator valve (40) applies the boosted line pressure to the actuator (27).

Based on the above structure, under normal running condition, by selecting auto-mode by a driver, certain hydraulic pressure varying due to the driving condition and so on is applied to the actuator (27). Under the above condition, the friction clutch (26) is engaged by certain engaging force and slippingly engaged based on frictional coefficient of road, wherein torque is distributed to the front and rear wheels by the center differential device (18) so that distribution between the front and rear wheels comes to certain distributing ratio (for example; 50%:50%). For example on snow roads and icy roads, frictional coefficient between the road and tire is small, so that the clutch (26) is nearly direct coupling condition, and distributes torque to the front and rear wheels per certain distributing ratio. On the other hand, on a road with surface having high frictional coefficient such as dry paved roads, the clutch (26) slips to absorb rotational difference of the front and rear wheels. Furthermore, when garaging or tight-cornering, hydraulic pressure based on the line pressure to the actuator (27) is reduced, so that the clutch (26) slips and absorbs large rotational difference between the front and rear wheels.

The numbers and marks shown in the parenthesis are to refer to the corresponding drawings(s), and there is no meaning to define structure of the present invention.

DETAILED DESCRIPTION OF THE PREFERRED EMBODIMENT

A power transmission for a four wheel drive vehicle U with transverse front-engine and full-time system, as shown in FIG. 1, has an input gear 1 to which power is transmitted from an engine (not shown) through a torque converter and an automatic transmission, and the gear 1 is fixed on a gear mounting case 2. The gear mounting case 2 is made up by separated cases, and fixed to the input gear 1 by a bolt 12. Further the case 2 is supported in a supporting case 9 by tapered roller bearings 9a, 9b, and the case 2 includes a front differential 3 and a differential limiting device 10. The front differential 3 has a front differential case 3c which is free rotationally supported by needle bearings 11a, 11b, in the gear mounting case 2. The differential case 3c supports a pinion shaft 3d supporting a pinion 3p to constitute a carrier, and the case 3c supports right and left side gears 3a, 3b. The side gears 3a, 3b are connected to right and left front axles 8r, 8l.

At the right side of the gear mounting case 2, or the back side of the engine, a transfer case 13 which can be divided into right piece is fixed and left piece, and the case 13 includes a transfer section 15 situated coaxially with the input gear mounting case 2 and the front differential 3. The transfer section 15 has a ring gear mounting case 16, and the ring gear mounting case 16 is capable of being divided into two separate pieces, and supports a ring gear 17 made up by a hypoid gear to drive rear wheels. And the case 16 is free rotationally supported by the transfer case 13 through a pair of tapered roller bearings 19, 19. The ring gear 17 meshes with a gear 21 made up by a hypoid gear, and the gear 21 is attached at the end of a pinion shaft 20. The driven pinion shaft 20 is connected to right and left rear axles through a known propeller shaft (not shown) and rear differential. The ring gear mounting case 16 includes a center differential 18, and the center differential 18 has a differential carrier 18c whose end is free. Further the differential carrier 18c is connected to a sleeve 2b which is extended from the input gear mounting case 2, the opposite side of a connecting boss 18c' is free, and the differential carrier 18c is free rotationally supported by the ring gear mounting case 16 through needle bearings 23, 23. And the differential carrier 18c has a pinion shaft 18d to support the pinion 18p, the right side gear 18b is directly spline-coupled to the ring gear mounting case 16, and the left side gear 18a is connected to a differential case 3c of the front differential 3 through a sleeve 3c'1 which is inserted in the connecting boss 18c' and encloses the right front axle 8r.

A spline fitting 22, is slidably connected to a sleeve 2b of the input gear mounting case 2 by a spline, and the spline fitting 22 is operated by a lever (not shown) and is switched to "lock position" engaging a spline made on a sleeve of the ring gear mounting case 16 (refer to upper side of FIG. 1) and "unlock position" (refer to lower side of FIG. 1). The spline fitting 22 constitutes a mechanical differential lock mechanism. The differential lock mechanism is unlocked in normal condition. However, when an inspection is conducted by setting tires on a roller, the position is switched to the lock position.

A differential motion limiting device 10, as covering the front differential 3, is installed in the input gear mounting case 2 which is coaxially laid with the front differential 3. The differential motion limiting device 10 has a wet type frictional multi-plate clutch 26 and a hydraulic actuator 27. In the clutch 26, separators are connected to the mounting case 2, and friction plates are connected to the differential case 3c. These separators and friction plates are controlled by the hydraulic actuator 27. The hydraulic actuator 27 has first piston 28 and second piston 29 which are oil-tightly contained in a cylinder made in the mounting case 2, and a reaction plate 30 which is oil-tightly laid between the first and second pistons. The first piston 28 contacts an outer brim of the second piston 29, and the reaction plate 30 contacts the end of the cylinder, so that these two pistons constitute "double piston". On the transfer case 13, a valve unit 31 for the differential limiting device 10 is installed. The control hydraulic pressure from the unit 31 is applied to the first piston 28 and the second piston 29 through a pipe 36, and oil passages 37 and 38.

Figure 3:
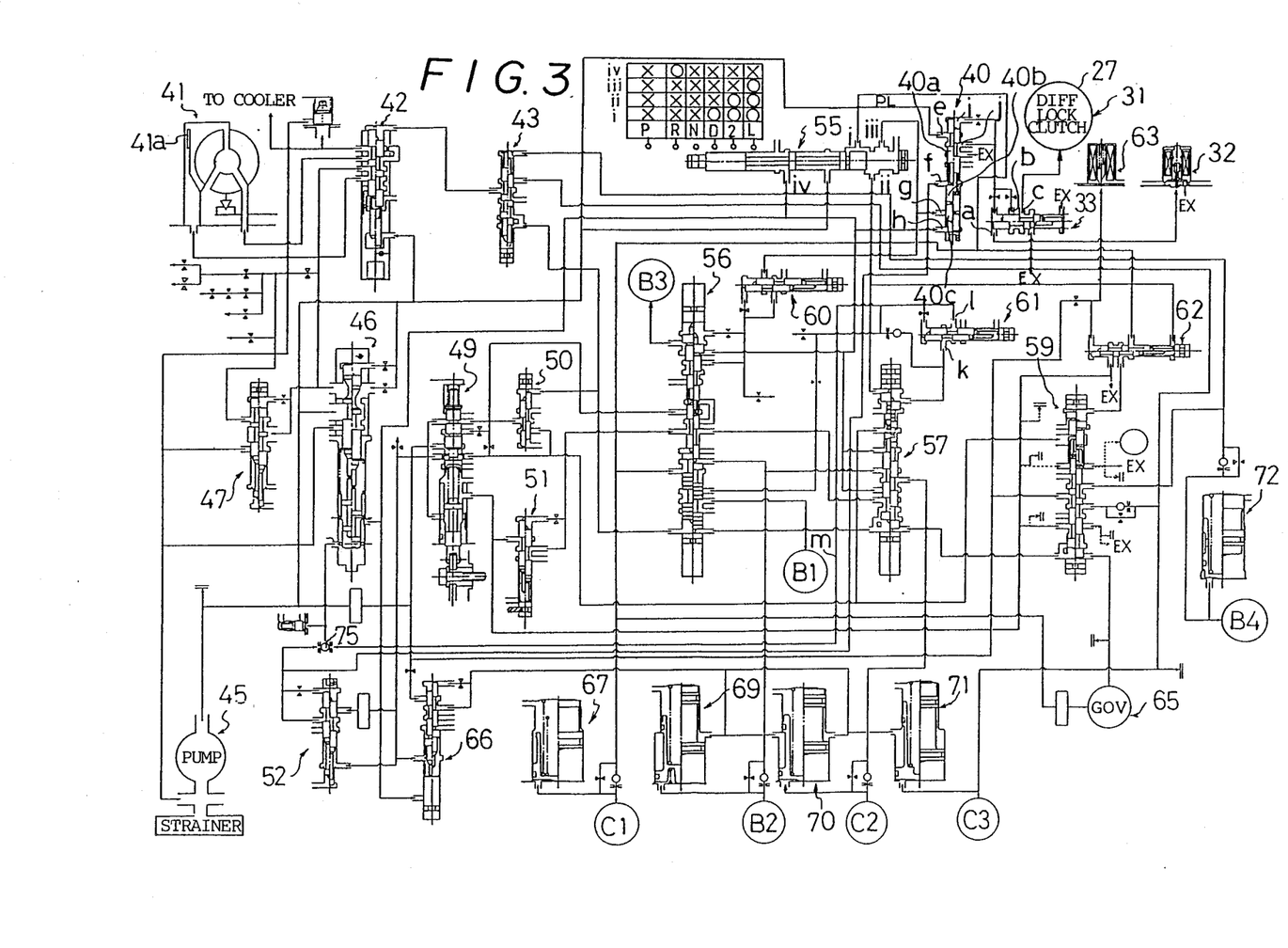
FIG. 3 is a view showing the hydraulic circuit of the present invention.

A valve unit 31, as shown in FIG. 2 in detail, has a solenoid valve 32 and a switching valve 33. The switching valve 33 has a port "a" connecting to a line pressure or regulator pressure reduced in accordance with the line pressure, and to the solenoid valve 32, a port "b" applying line pressure or modulator pressure, port "c" connecting to the hydraulic actuator 27, and a drain port EX. In FIG. 3, 35 is an orifice having certain diameter.

The operation of the present invention is explained as follow:

The engine rotation shifted to required speed in the automatic transmission is transmitted to the input gear mounting case 2 through the input gear 1. In normal running, the driver sets a shift lever to D range and selects auto-mode of the switch 81, the solenoid valve 32 of the valve unit 31 is ON, hydraulic pressure at the port a is drained, and the switching valve 33 becomes "lower-half-position" shown in FIG. 2. It may be possible to set the switching valve 33 drained when the solenoid 32 is OFF. Under this condition, the application port b and the port c are connected, line pressure or regulator pressure reduced in accordance with the line pressure is applied to the first and second pistons 28, 29 through the pipe 36 and the oil passages 37, 38, and the clutch 26 is engaged by certain engaging force. Accordingly the center differential 18, its differential carrier 18c and the right side gear 18a are connected with certain engaging force, and the differential motion is limited by certain regulating force. Due to this motion, in the case that friction force between road surface and tires is smaller than the reguarating force defined above, (for example: snow road, dart road) based on the engaging force of the clutch 26, the center differential 18 is under nearly direct coupling condition, wherein the rotation of the input gear mounting case 2 is transmitted to the differential case 3c of the front differential 3 through the center differential 18 which rotates together with the friction clutch 26, further transmitted to the right and left side gears 3a, 3b through the pinion 3p to drive the right and left front wheels, and transmitted to the pinion shaft 20 through the ring gear 17 fixed on the center differential 18 and the gear 21. The rotation is transmitted to a rear differential where torque is distributed, after that and then the rotation drives the right and left rear wheel.

In the case that the friction force between road and tire is nearly balanced with the regulating force of the clutch 26, (for example: comparatively high speed running on the paved road) the clutch 26 is slidingly engaged so that slip of the tires is not developed. The center differential 18 absorbs rotational difference of the front and rear wheels and distributes torque to the front and rear wheels so that the torque distribution ratio of the front and rear wheel nearly comes to 50%:50%.

While in the case of turning sharp at low speed, such as garaging, rotational difference between the front and rear wheels is developed. However this time the throttle opening is small, so the regulator pressure is low, then the engaging force of the hydraulic actuator is small. Consequently the engaging force of the friction clutch 26 of the differential motion limiting device 10 is small, so the friction clutch 26 slips so that the relative rotation between the right and left side gears 18a, 18b of the center differential 18 is allowed. Then the center differential 18 comes under differential motion to prevent tight corner braking, and transmits torque to the front and rear wheels.

In the case that running on the mountain roads having continuous sharp curves, the driver can set the valve unit 31 at off-position by one's own choice. Under this condition, the solenoid valve 32 is OFF, certain hydraulic pressure is applied to the port a of the switching valve 33, the valve 33 is switched to upper-half-position, and the port c is connected to the drain port EX. Then the hydraulic pressure to the actuator 27 is cut, and the friction clutch 26 is released. Then the rotation of the mounting case 2 is transmitted to the differential carrier 18c through the sleeve 2b, further the rotation is transmitted to the right and left side gears 18a and 18b through the differential pinion. The rotation of the left side gear 18a is transmitted to the differential case 3c through the sleeve 3c'1, and further the rotation is transmitted to the right and left front axles 8r, 8l from the differential pinion 3p and through the right and left side gears 3a, 3b. On the other hand, the rotation of the right side gear 18b is transmitted to the gear mounting case 16 which is spline-coupled with the gear 18b, and transmitted to the pinion shaft 20 through the transfer drive gear 17 and the transfer driven gear 21, and then to the right and left rear wheels through a propeller shaft (not shown).

The valve unit 31 is designed to control ON/OFF continuously or intermittently under the condition of high speed state such as at four speed step and vehicle speed over 100 km/h to radiate the heat of the clutch 26.

In the above embodiment, oil is applied to the first piston 28 and the second piston 29 from one oil passage to be used simply as a power producing mechanism, it is possible that the oil is applied from respective oil passages to the piston 28 and 29 for precise slip-control.

Along FIG. 3, on embodiments, wherein a modulator pressure reduced proportionately from the line pressure is applied to the hydraulic actuator 27, is explained below.

31 is a valve unit having the switching valve 33 and the solenoid valve 32, wherein only the valve unit 31 is installed in the transfer section. The valves explained herein after are installed in the valve body of the automatic transmission. 40 is a regulator valve for the differential motion limiting device. 41 is a torque converter having a lock up clutch 41a. 42 is a lock up release valve, 43 is a lock up signal valve. 45 is an oil pump, 46 is a primary regulator valve, 47 is a secondary regulator valve, and 49 is a throttle valve having a kick down valve. 50 is a cut back valve, 51 is a detent regulator valve, and 52 is a throttle modulator valve. 55 is a manual valve, 56 is a 1-2 shift valve, 57 is a 2-3 shift valve, and 59 is a 3-4 shift valve. 60 is a low coast modulator valve, 61 a second coast modulator valve, 62 is a 3-4 switch valve, 63 is a solenoid valve to control the switch valve 62, and 65 is a governor valve. 66 is an accumulator control valve, 67 is a C1 accumulator, 69 is a B2 accumulator, 70 is a C2 accumulator, 71 is a C3 accumulator, and 72 is a B4 accumulator. And, in hydraulic servos C1, C2, C3, B1, B2, B3 and B4, C1 is for a forward clutch, C2 is for a direct clutch, and C3 is for an over drive direct clutch. B1 is for a second coast brake. B2 is for a second brake, B3 is for a first and reverse brake, and B4 is for an over drive brake.

The regulator valve 40, as shown in FIG. 2 in detail, has a port e for line pressure, a port f for throttle pressure, a port g for L range line pressure, a port i for feedback pressure, and regulating port j and drain port EX. And the valve 40 also has two plugs 40b and 40c having different cross sections.

And the second coast modulator valve 61 has a pork k which is connected to a 2.L port (ii) through port q and port r of the 2-3 shift valve 57. A regulating port 1 of the valve 61 is connected to a feedback port o, and the port 1 is connected to the back pressure port n of the primary regulator valve 46. The valve 61 includes comparatively strong spring 61a, which can apply higher modulator pressure than usual one to the back pressure port n. Hydraulic pressure from the oil pump 45 is connected to the port p of the primary regulator valve 46 where the hydraulic pressure is regulated and connected to the regulator valve 40 through an oil passage s.

Based on the above structure, in this embodiment, under the normal running, or the manual valve 55 is at D range, no oil is applied to the L range line pressure port e and R range line pressure port h of the valve 40. Under this condition, line pressure from the primary regulator valve 46 is applied to the port e of the valve 40, throttle pressure from the throttle valve 52 is applied to the port f, and further regulating pressure from the port j is applied to the feedback port i. As a result, the regulator valve 40 becomes right-half-position, the first and second plugs 40b, 40c still sit at the bottom, then to the bottom of regulating spool 40a, throttle pressure and pressing force of a spring are applied, and to the upper side of the regulating spool 40a, regulated pressure is feedbacked and the both pressure are balanced. Due to this, the line pressure $P_L$ at the port e is reduced according to certain ratio, and such reduced pressure (modulator pressure) is applied from the port j to the switching valve 33 of the valve unit 31.

Figure 4:
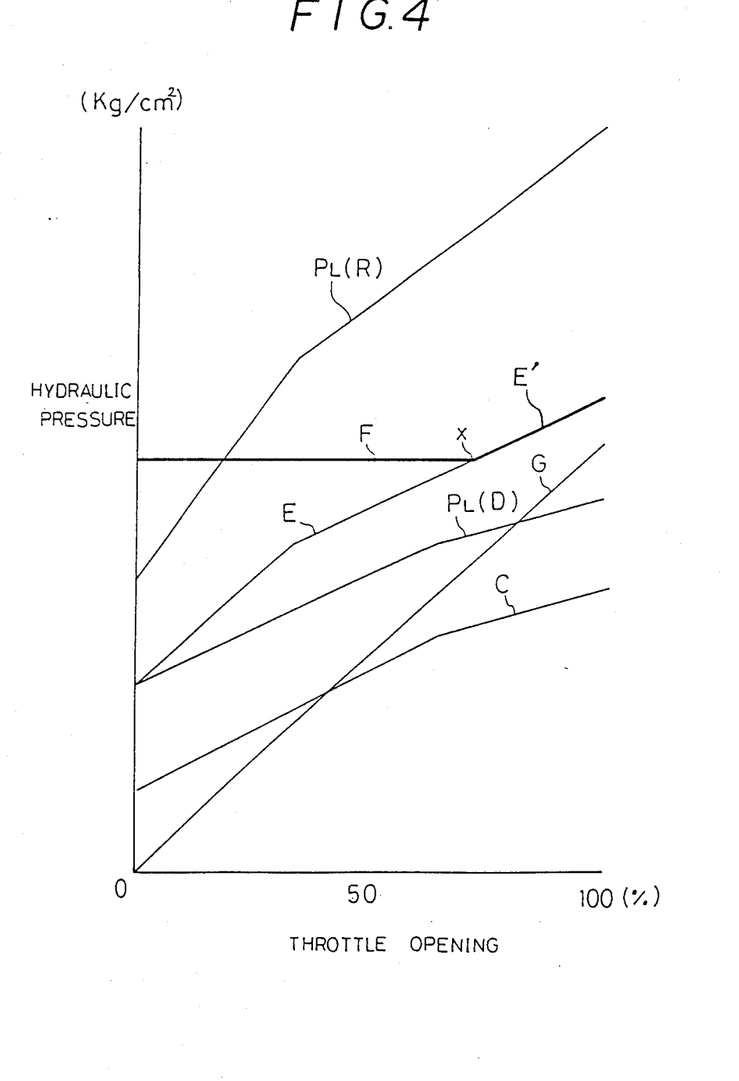
FIG. 4 is a view showing state of change of each hydraulic pressure per throttle opening.

Consequently, to the hydraulic actuator 27 of the differential motion limiting device 10, hydraulic pressure C (refer to FIG. 4) which is reduced proportional to the line pressure $P_L(D)$ in FIG. 4, is applied, and the clutch 26 is engaged by weak engaging force. Differential motion regulating force by the center differential 18, or the pressing force capable of distributing torque to 50:50, becomes small, so that rotational difference of the front and rear wheels is securely absorbed. Loss of fuel efficiency, wear of tires, and tight-corner-braking are prevented.

In case one tire turned without load by being caught in a gutter and so on, the vehicle may not be recovered from an accidental state if above weak regulating force is still working. To prevent this, the manual valve 55 is changed to L or R range.

When the manual valve is moved to R range, line pressure is applied from R port (iv) of the manual valve 55 to R range port h of the regulator valve 40. Under this condition, the regulator valve 40 becomes left-hand-position, line pressure working to the bottom of the plug 40c overcomes the throttle pressure working to the upper side of the plug 40b and the feedback pressure (line pressure) working to the upper side of the spool 40a, then the line pressure moves the spool 40a with the plugs 40b, 40c, and the port e and the port j are completely through. As a result, the high line pressure $P_L(R)$ (refer to FIG. 4) from the primary regulator valve 46 is applied to the port j of the valve 40 through the switching valve 33, so that the line pressure is applied to the hydraulic actuator 27 of the differential motion limiting device 10. The engaging force of the clutch 26 becomes large, and increases the regulating force of the center differential 18, so that the tire caught by the gutter is freed.

In the case that tire stick or large ascending force is necessary, the manual valve 55 is shifted to L range. The line pressure from the L range port (iii) of the manual valve 55 is applied to the port g of the regulator valve 40. Under this condition, the lower side plug 40c sits at the bottom, the line pressure from the port g overcomes the feedback pressure working to the upper side of the spool 40a, and moves the spool 40a with the plug 40b, and then the port e and the port j are completely through.

At L range, the line pressure is applied from 2.L port (ii) of the manual valve 55 to the port k of the second coast modulator valve 61 through the 2-3 shift valve 57. The modulator valve 61 sets the spring so that the modulator pressure becomes high, and the modulator pressure is applied from the port 1 of the valve 61 to the port n of the primary regulator valve 46 through the oil passage m and the check ball 75. Due to the above, as shown in FIG. 4, under the condition that the throttle opening is small, the line pressure by the primary regulator valve 46 (E) based on the modulator pressure set comparatively high, becomes nearly stable oil pressure F regardless of the throttle opening, and when the throttle opening exceeds certain amount x, the line pressure by the primary regulator valve 46 becomes oil pressure E' based on the throttle pressure to which no cut back pressure is applied.

Consequently, from the port j of the regulator valve 40, boosted line pressure is applied to the hydraulic actuator 27 through the switching valve 33, so the clutch 26 is engaged by comparatively large engaging force from the area where the throttle opening is small, and differential motion of the center differential 18 is regulated by large regulating force. In FIG. 4, G shows the throttle pressure.

In the above mentioned embodiment, the regulator valve 40 is laid in the oil passage s communicating to the hydraulic actuator 27. However it may be possible to directly connect z points by eliminating a portion A, as shown in FIG. 2.

Figure 5:
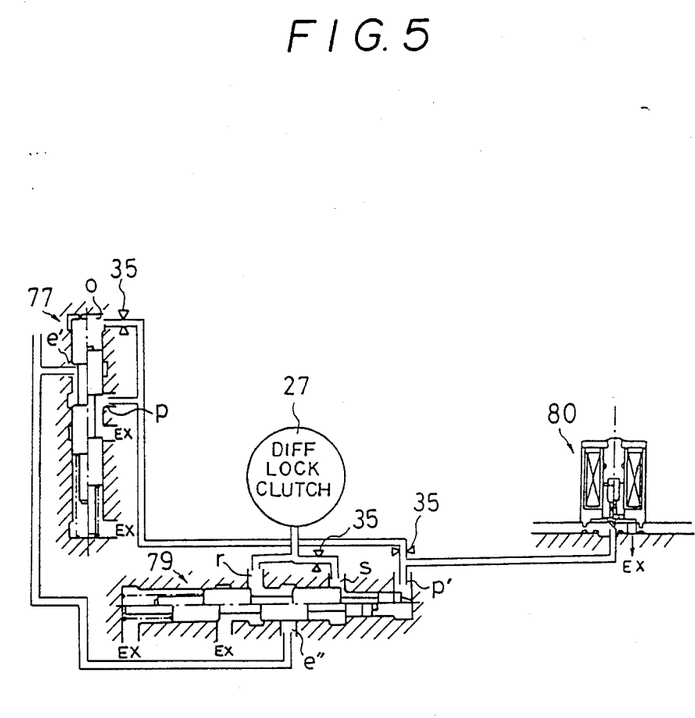
FIG. 5 is a view of hydraulic circuit of another embodiment.

Along with FIG. 5, an embodiment for controlling the differential limiting device 10 by electrical signals, is explained wherein a regulator valve 77, a modulator valve 79 and a duty solenoid valve 80 are laid. The regulator valve 77 has a line pressure port e', a feedback port o and a regulating port p. The modulator valve 79 has a modulating port p', an application port e'', a port r and a feedback port s.

Accordingly, the line pressure is applied to the port e' of the regulator valve 77, the line pressure is regulated by balancing pressing force of the spring and the feedback pressure from the port o, and the regulated line pressure is applied from the port p to the duty solenoid valve 80. The duty solenoid valve 80 is controlled by electric signals from the sensors S1 and S2, which controls the hydraulic pressure from the regulating port, and applies it to the modulating port p' of the modulator valve 79. On the modulating valve 79, pressing force of the spring, the feedback pressure from the feedback port s and the modulating port p' are balanced, so the line pressure at the application port e'' is modulated, and then the modulated line pressure from the port r is applied to the hydraulic actuator 27.

Due to the above, the differential motion limiting device 10 can electronically control the regulating force of the center differential device 18.

TECHNICAL ADVANTAGES

Under the normal running condition, certain volume of hydraulic pressure is applied to the hydraulic actuator (27) of the differential motion limiting device (10), so that the wet-type frictional clutch (26) is engaged with certain engaging force. As a result the center differential device (18) distributes and transmits torque to the front and rear wheels so that the distributing ratio of the front and rear wheels becomes certain value. Because of the above, the driver is not required to do complicated driving operation, proper four wheel driving condition is maintained, and furthermore stating acceleration, high speed driveability and stable driving control are enhanced. Moreover, the frictional clutch (26) is only for regulating the center differential (18), so the clutch (26) is not required to have large capacity, such as for driving the rear wheels. Consequently, the clutch (26) can easily absorb rotational difference between the front and rear wheels in the case of high frictional coefficient, as paved roads. Based on the small torque capacity, when the throttle opening is small, hydraulic pressure to the actuator (27) is lowered, so tight-corner-braking is securely prevented.

Only applying the line pressure or hydraulic pressure reduced proportionately from the line pressure to the hydraulic actuator (27), expensive electronic devices are not required to incorporate the system, and the cost of the structure is kept inexpensive.

In the case that the hydraulic pressure which is reduced per certain ratio by the regulator valve (40) is applied to the actuator (27), the rotational difference between the front and rear wheels is much more securely absorbed. As a result, fuel efficiency is enhanced, and wear of tires and tight-corner-braking are securely prevented.

Further, in the case that the hydraulic pressure from the modulator valve (61) which applies certain hydraulic pressure at low speed position of the manual valve (55) is applied to the back pressure port (n) of the primary regulator valve (46) to boost the line pressure, at low throttle opening, up to certain volume, and then the boosted line pressure is applied to the actuator (27). As a result only by a simple operation such as shifting the manual valve (55) to the low speed position (for example, L range), the boosted hydraulic pressure is applied to the actuator (27), so that the center differential device (18) is regulated by strong engaging force. In particular, at low throttle opening area which does not provide wheels with large driving force, differential motion of the center differential device (18) is strongly regulated, which enables escape from the sticking condition of the tires, and provides strong slope ascending force.

And, in the case that the hydraulic pressure reduced with certain ratio through the regulator valve (40) is applied to the actuator (27), rotational difference between the front and rear wheels is much more securely absorbed, fuel efficiency is enhanced, and wear of tires and tight-corner-braking are securely prevented, while, though it becomes hard to escape from sticking of tires because of weak regulating force of the center differential device (18), the boosted line pressure by shifting the manual valve (55) easily releases such sticking condition.

Moreover, in case of sticking of tires, by shifting the manual valve (55) to the reverse position (R) or the low speed position (L), the regulator valve (40) is switched, so that high hydraulic pressure such as the line pressure is applied to the actuator (27). Consequently, by quite simple operation, differential motion of the center differential device (18) is regulated, and the sticking condition is easily released.

In particular, at L range, as the line pressure which is boosted up to certain volume by the regulator valve (46) is applied to the actuator (27) through the regulator valve (40), the wet-type frictional clutch (26) is engaged by strong engaging force, and differential motion of the center differential device (18) is much more securely regulated, so the sticking condition of the tires is much more easily released.

We claim:

1. A power transmission device for a four wheel drive vehicle having an automatic transmission, comprising: a differential device for transmitting torque from the transmission to front and rear wheels, said differential device regulating torque distribution rate between the front and rear wheels and including a frictional clutch having a plurality of friction plates indirectly connected to one side of the front and rear wheels, and a hydraulic actuator for controlling the frictional clutch and having a cylinder and at least one piston,
   a primary regulator valve for changing pressurized oil to line pressure,
   a regulator valve communicating with the primary regulator valve, said regulator valve selectively changing the line pressure to reduced modulator pressure,
   a manual valve communicating with the primary regulator valve and the regulator valve, said manual valve being operated by a user so that when actuated, flow of the line pressure is changed, and
   means for selectively supplying one of the line pressure and reduced modulator pressure to the hydraulic actuator, said means for supplying being actuated by means of the manual valve so that in a regular running mode of the manual valve, the reduced modulator pressure is applied to the hydraulic actuator, and in at least one predetermined mode of the manual valve, the line pressure is applied to the hydraulic valve.

2. A power transmission device according to claim 1, wherein said differential device comprises a differential carrier indirectly connected to the automatic transmission, a left side gear indirectly connected to one of the front and rear wheels, and a right side gear indirectly connected to the other of the front and rear wheels, said frictional clutch being situated between the differential carrier and one of the left and right side gears.

3. A power transmission device according to claim 1, wherein said at least one predetermined mode of the manual valve is a lower range in forward multiple speeds.

4. A power transmission device according to claim 3, wherein said at least one predetermined mode of the manual valve includes L range.

5. A power transmission device according to claim 1, wherein said at least one predetermined mode of the manual valve includes R range.

6. A power transmission device according to claim 1, wherein in case the modulator pressure is applied to the hydraulic actuator, the frictional clutch causes slippage at a relatively low load, and in case the line pressure is applied to the hydraulic actuator, the frictional clutch does not cause slippage at a relatively high load.

7. A power transmission device according to claim 1, wherein said regulator valve comprises a regulator spool, a line pressure port for receiving the line pressure, a regulating port communicating with the hydraulic actuator, a drain port, a feedback port communicating with the regulating port and receiving the modulator pressure to supply at one end of the regulator spool, and a spring situated at the other end of the regulator spool.

8. A power transmission device according to claim 7, wherein said means for selectively supplying one of the line pressure and modulator pressure includes plugs arranged coaxially with the regulator spool of the regulator valve.

9. A power transmission device according to claim 1, wherein said regulator valve includes a regulator spool, and said means for selectively supplying one of the line pressure and modulator pressure includes a first plug situated coaxially with and to abut against the regulator spool, said first plug having a diameter different from a diameter of the regulator spool, a second plug situated coaxially with the regulator spool to abut against the first plug and having a diameter different from the diameter of the regulator spool, a L range line pressure port for receiving the line pressure within a predetermined low range in the forward multiple ranges of the manual valve and supplying the line pressure to one of a portion between the first and second plugs and an end of the second plug, and an R range port for receiving the line pressure at R range of the manual valve and supplying the line pressure to the other of the portion between the first and second plugs and the end of the second plug.

10. A power transmission device according to claim 1, further comprising a solenoid valve, and a switching valve situated between the regulator valve and the hydraulic actuator, said switching valve being controlled by the solenoid valve to lead the oil from the regulator valve to one of the hydraulic actuator and drain.

11. A power transmission device for a four wheel drive vehicle having an automatic transmission, comprising:
  a differential device for transmitting torque from the transmission to front and rear wheels, said differential device regulating torque distribution rate between the front and rear wheels and including a frictional clutch having a plurality of friction plates indirectly connected to one side of the front and rear wheels, and a hydraulic actuator for controlling the frictional clutch and having a cylinder and at least one piston,
  a primary regulator valve for changing pressurized oil to line pressure,
  means for supplying pressurized oil from the primary regulator valve to the hydraulic actuator,
  a manual valve communicating with the primary regulator valve and the means for supplying presurized oil, said manual valve being operated by a user so that when actuated, flow of the line pressure is changed,
  a modulator valve connected to the manual valve, said modulator valve changing the line pressure to regulated modulator pressure, and
  means for boosting the line pressure of the primary regulator valve to higher pressure, said means for boosting the line pressure being connected to the primary regulator valve and starting to actuate by the modulator pressure which is generated at the modulator valve when the line pressure is supplied to the modulator valve by selecting at least one predetermined driving mode of the manual valve, whereby boosted line pressure is supplied to the hydraulic actuator.

12. A power transmission device according to claim 11, wherein said differential device comprises a differential carrier connected to the automatic transmission, a left side gear indirectly connected to one of the front and rear wheels and a right side gear indirectly connected to the other of the front and rear wheels, said frictional clutch being situated between the differential carrier and one of the left and right side gears.

13. A power transmission device according to claim 17, wherein said at least one predetermined mode of the manual valve is a lower range in forward multiple speeds.

14. A power transmission device according to claim 13, wherein said at least one predetermined mode of the manual valve includes 2 range.

15. A power transmission device according to claim 11, wherein in case the line pressure is supplied to the means for supplying pressurized oil, the frictional clutch causes slippage at a relatively low load, and in case the boosted line pressure is supplied to the means for supplying pressurized oil, the frictional clutch does not cause slippage at a relatively high load.

16. A power transmission device according to claim 11, wherein said modulator valve is a second coast modulator valve.

* * * * *